March 15, 1949.　　　A. L. GENTER　　　2,464,223
CONTINUOUS DISK FILTER

Filed Aug. 8, 1944　　　3 Sheets—Sheet 1

Inventor
Albert L. Genter

March 15, 1949. A. L. GENTER 2,464,223
CONTINUOUS DISK FILTER

Filed Aug. 8, 1944 3 Sheets-Sheet 2

Inventor
Albert L. Genter

By Cushman Darby Cushman
Attorneys

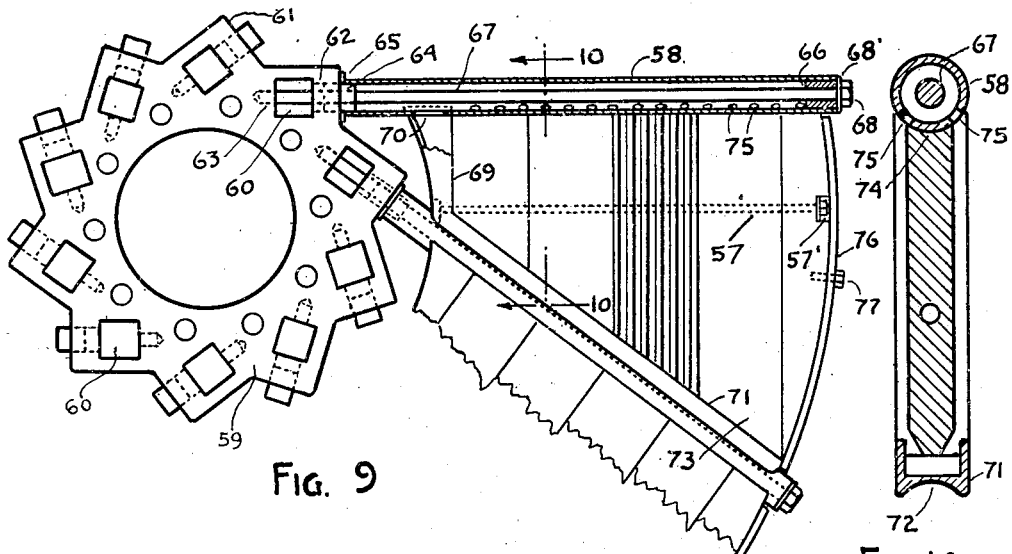
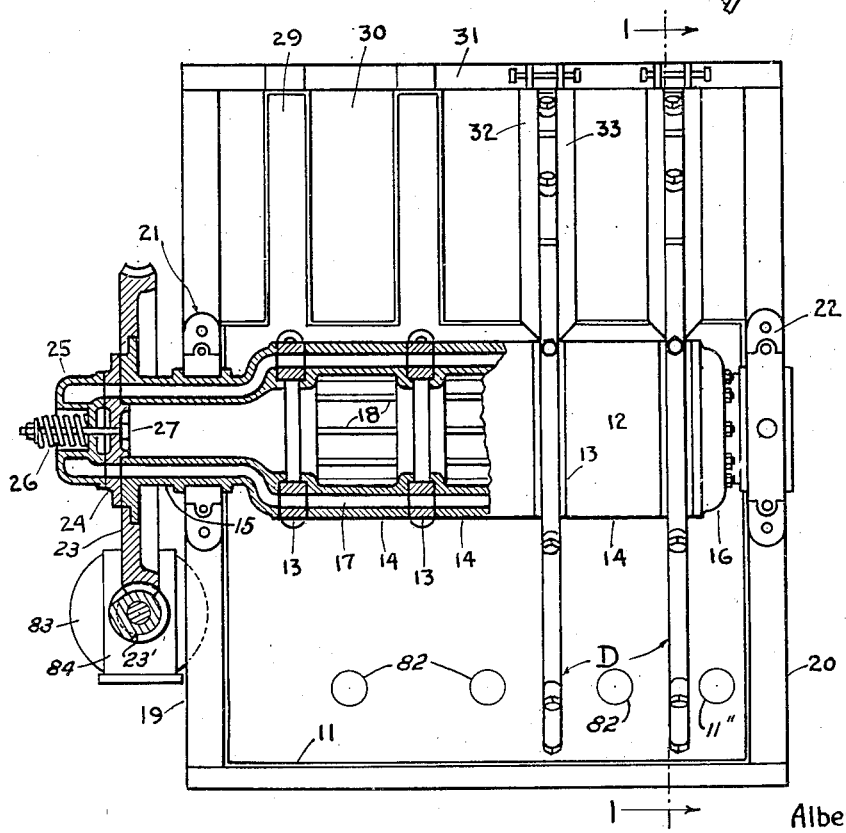

Patented Mar. 15, 1949

2,464,223

UNITED STATES PATENT OFFICE 2,464,223

CONTINUOUS DISK FILTER

Albert L. Genter, Baltimore, Md.

Application August 8, 1944, Serial No. 548,566

18 Claims. (Cl. 210—200)

My invention relates to improvements in continuous disk filters of the type disclosed in U. S. Patents Nos. 1,266,133; 1,293,555; and 1,538,980.

Such prior art filtration devices consist of one or more sectionalized disks made up of a number of sectors having side filtering surfaces, adapted to be mounted on a multiple ported horizontal shaft and to operate partially immersed in a liquid-solid mixture to be separated by filtration in much the same manner as continuous drum or cylindrical filters.

Radially spaced individual filter units shaped as truncated sectors, usually eight or ten in number are grouped around the center shaft to form each complete sectionalized disk. By the term "radially spaced" is meant that the spacing means between every pair of adjacent independent sectors forming the disk radiate from a common center in the rotatable center shaft, namely as radii, and the radial sector margins are collinear and/or parallel with said radii. The center shaft carries as many filtrate conduits as there are disk sectors and these are located around the shaft axis and run parallel to same. On the one hand these filtrate conduits are separably connected with the individual disk sectors, and on the other hand connect with openings in an automatic filter valve, at either or both ends of the center shaft, which controls the pressure differential causing filtration, cake deposit and cake discharge.

After the cake is discharged from any revolving sector the empty sector travels a definite distance before it again becomes completely submerged in the unfiltered mixture and the suction or positive pressure action causing filtration is again applied to successive rotating disk sectors. This action must be accomplished without admitting free air to any or all sector interiors used for forming and draining cakes, otherwise the pressure differential causing filtration and drying would be destroyed. Therefore, the total angular distance traveled during cake removal and effective submergence of any filter sector constitutes the area fraction of any disk not used for cake building and drying. Proportioning the number of disk sectors economically possible with different disk diameters so that the total effective area fraction forming and draining cake remains at a maximum is equally important in disks of small and large diameters. In any case the total effective fraction of filter sector area in effective use depends largely on the level of the unfiltered mixture in the filter tank, the depth of submergence of the sectors below this level, the location of the geometric center of area of each sector below this bath level at the time the sector is automatically opened to filtration pressure differential, and the arc through which this geometric center of sector area travels during submergence. This position of the geometric center of sector area and its arc of travel under submergence determines the length or duration of the cake forming cycle. All sectors between cake removal and this submergence depth are necessarily dead.

As the cake draining, washing, or drying fraction of any entire disk revolution usually requires more time than for cake formation and one or even two sectors have to be out of service for cake removal and dead travel thereafter, the level of the unfiltered mixture cannot be raised too high on the center shaft of such continuous filters. The three functions of cake deposition, draining and discharging of same in such filters are tied together in the entire rotating disk and controlled by the automatic valve. No matter how much one varies the disk speed these functions cannot be varied in time relationship to one another. This variation is largely a function of the submergence level of the unfiltered mixture in the tank and on the disks. As it is essential to the economic success of such filters to have the filter cake sufficiently thick and dry for automatic removal from the disk sectors, the proper cake formation and draining demands most of the time and area factors. And, as above stated, more time is required for proper cake draining than for cake formation, especially where the normal residual cake moisture has to be displaced by spray washing with another liquid after the cake leaves submergence and before the cake is further drained and discharged.

As a low submergence level, i. e., definitely below the horizontal centerline of the rotatable shaft and disk, provides a longer drying and/or washing arc on all continuous rotary filters this has materially handicapped the adoption of standard continuous disk filters in some industrial filtration fields simply because a low submergence level means a very short cake forming cycle with the result that the thin cake deposited on the sector surfaces readily compacts and drains but is too thin to be effectively scraped and discharged from the inflated filter medium of the revolving sectors. Unless a filter cake has a certain thickness of felted or interlocked body structure and dryness it cannot be stripped or peeled in integral portions entirely free of the filter media, thus leaving the initial filter medium as clean as possible. Otherwise the medium rapidly becomes smeared and blinded through the scraping action of the cake removal means and the entire disk surface rapidly becomes useless.

Compared with such standard continuous disk filters my improvement in continuous rotary vacuum and pressure disk filters provides for overcoming the foregoing handicap to the wide adoption of such filters, i. e., my improvement provides for producing a greater cake thickness at the same or even lower submergence level, under the same pressure differential conditions, with the same number of sectors to each disk when filtering the same type of material. My improvement is shown in illustrative embodiment in the accompanying drawings in which Figure 1 is a section substantially on line 1—1 of Figure 8 showing in elevation a segmental disk in accordance with my invention.

Figure 8 is a view, partly in plan and partly in horizontal section, of apparatus in accordance with the invention.

Figure 9 is a view similar to that of Figure 5 showing partly in section and partly in elevation another form of segment structure and attachment; and Figure 10 is an enlarged section on line 10—10 of Figure 9.

Figure 2:
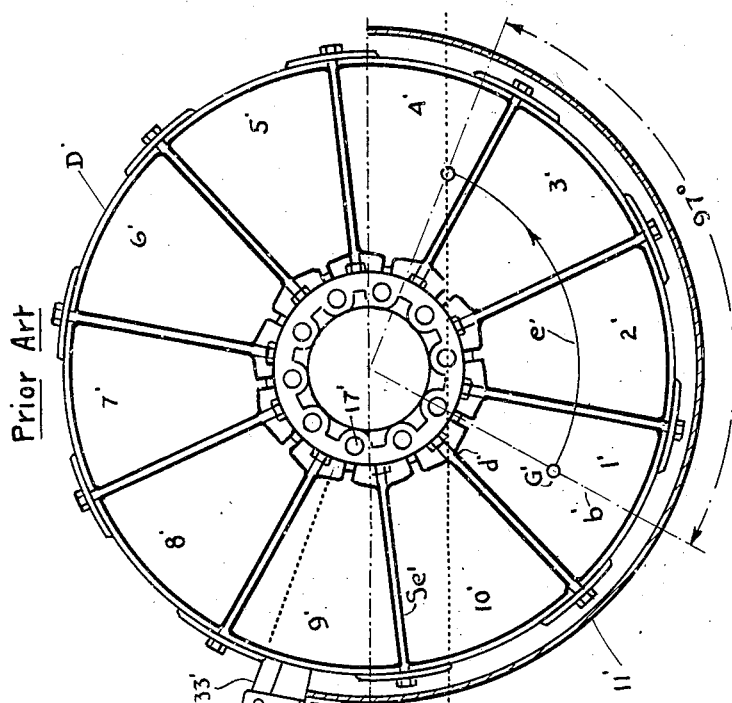
Figure 2 is a similar section of prior art apparatus, shown for the purpose of ready comparison.
Figure 1:
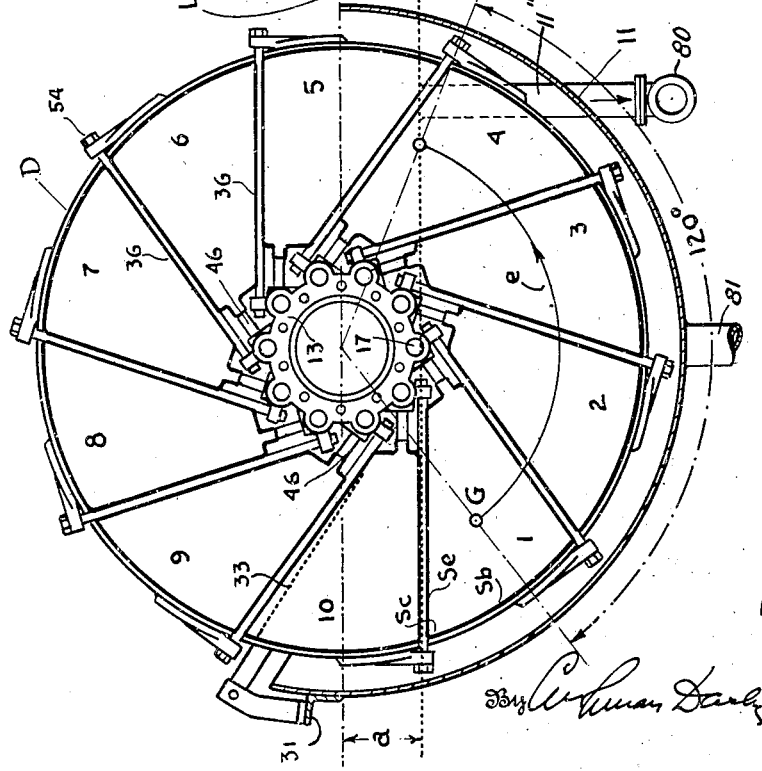

The nature of my improvement will be readily evident from a comparative study of Figs. 1 and 2, wherein the upper or submergence level, shown by horizontal dotted line "L," of the mixture to be subjected to filtration is identical in both tanks, 11 and 11', of my improved filter, Fig. 1, and the standard filter, Fig. 2. That is, in both instances the submergence level L is the same distance $a$ below the horizontal line $c$ passing through the center of the revolving center shaft of each filter, and the disks D of my improved type and the the standard filter have the same number, in this case ten, of sectors or disk filtering elements, and same area per disk. As it is important to the efficient operation of my improvement to maintain the normal operating submergence level L a definite distance $a$ below the center line $c$, means are indicated in Figures 1 and 8 for so doing. As here shown, such means comprise an overflow pipe 11" projecting upwardly into tank 11 through a sealed opening at the side of shaft 12 with its upper end open at the level L and adapted to convey excessive unfiltered feed away from the tank through a header 80. The feed may enter tank 11 by a pipe or pipes 81 in connection with the tank below the center shaft and between the disks. There may be a single overflow 11" in the case of a single disk, or with multiple disks as in the present case, similar overflows 82 may be located between the disks at a uniform level. In the sectional views shown for illustrative purposes in Figures 1 and 2 the direction of rotation of the centershafts and disks is counter-clockwise as indicated by the curvilinear arrows $e$ and $e'$ in both disks.

Referring to Figure 2, showing the typical standard disk construction through the filter tank, rotating filter shaft and one filter disk assembled on the latter, the disk D' is composed of ten disk sectors 1' to 10'. As before stated each disk element is a truncated disk sector because: (a) Each sector is bounded on both sides by radial spacing rods which, by definition, are essentially radii of the rotary disk. The sectors are therefore radially spaced. (b) The center line $b'$ of each sector passes through the center of the rotatable filter shaft. (c) The inner end of each sector is truncated and the radial margins or sides of each sector are of equal length. Therefore the geometric center of area, G', of each sector falls on the radial center line of each sector.

Suction or filtration pressure differential cannot be applied to revolving sector No. 10', which has just been cleaned free of its cake, until this sector arrives fully under submergence, which condition is shown by the position of sector No. 1'. This completely submerged location is actually determined by the upper corner $d'$ of sector No. 1' becoming safely and fully submerged in the sludge bath, namely, in practice about an inch beneath the upper surface of the unfiltered mixture, known herein as the submergence level and shown by the dotted line L. By the time this corner has become safely submerged the geometric center of the sector area, G' of each successive truncated sector is materially submerged along the arc $e'$ through which the actual center of disk area necessarily travels. In the typical example of the standard disk and sector construction illustrated in Figure 2, the arc remaining through which the geometric center G' of sector No. 1' and its successors can travel to form a cake after complete submergence of sector corner $d'$ and before said geometric center emerges from the sludge bath, is 97°. At various safe submergence levels of the bath below the horizontal center line of the rotatable shaft and the truncated apex of the disk sectors, this arc of travel is, as before emphasized, determined more by the last corner of each sector submerged than by the actual position of the geometric center of area of sector area.

In my improved disk construction as shown in Figure 1 this is not the case. I do not employ true sector divisions of the circular disk filter area in building up each complete disk. I employ triangular disk segments having lateral edges collinear with lines converging to a point definitely eccentric to the center of the rotatable shaft and disk. This point is largely determined by the location of the average level L of the bath of unfiltered mixture below the horizontal center line or axis of rotation of the shaft and disk. The angle of convergence for the convergent margins is necessarily determined by the number of sectors both in the standard disk and of segments in my improved disk. This angle is the same for disks having the same number, $n$, of sectors or segments, namely, $$\frac{360°}{n}$$

each, or 36 degrees in the cases illustrated in Figures 1 and 2. However, in the standard disk construction the $$\frac{360}{n}$$

degrees are equally spaced between N true radii of the disk, and in my improved construction the successive $$\frac{360}{n}$$

degrees are equally spaced from the intended average level L of the unfiltered bath, or from a line substantially parallel with this level, said line necessarily being a chord of the disk, rather than a radius or true diameter of the same.

Referring more particularly to structure, in Figure 8, reference numeral 12 designates a shaft comprising ring sections 13, spacer sections 14, and bearing portions 15 and 16. The shaft is provided with ten longitudinally extending conduits 17 arranged equi-distantly around the shaft axis and the several sections are held together by bolts 18 which extend through a shoulder of bearing portion 15 and through a closure cap which forms a part of bearing portion 16. The upper edge of the tank is rimmed by angles and on those designated by the reference numerals 19 and 20 are fixed bearings 21 and 22 for the bearing portions 15 and 16. Bearing portion 15 has fixed thereon a worm wheel 23 engageable by a worm 23' to drive the shaft at the required speed and to rotate same and the disk segments S of Figures 1, 3, 5 and 9 in the direction of the curvilinear arrow e shown in Figure 1, which direction is, to be more specific, always in the direction of convergence of the segment margins. In the present case, the worm wheel 23 is driven counter-clockwise from a motor 83 which drives through a speed reducer 84 to the worm 23'. The passages 17 are continued through a wear plate 24 fixed to the end of bearing portion 15. Reference numeral 25 represents a stationary automatic valve yieldingly held against the wear plate by a compression spring 26 on the bolt 27. Valve 25 controls the opening of the successive filtrate conduits to the filtration differential.

The filter disks, designated generally by the reference letter D, are carried by the ring sections 13. That part of the tank 11 in which the disks ascend extends uninterruptedly from side to side, whereas on the descending side the tank comprises a separate branch 29 for each filter disk, the branches being separated by spaces 30. Mounted on an angle 31 which extends along the outer ends of the branches is a pair of scrapers 32 and 33 for each disk. The detached cake drops through the spaces 30.

Figure 5:
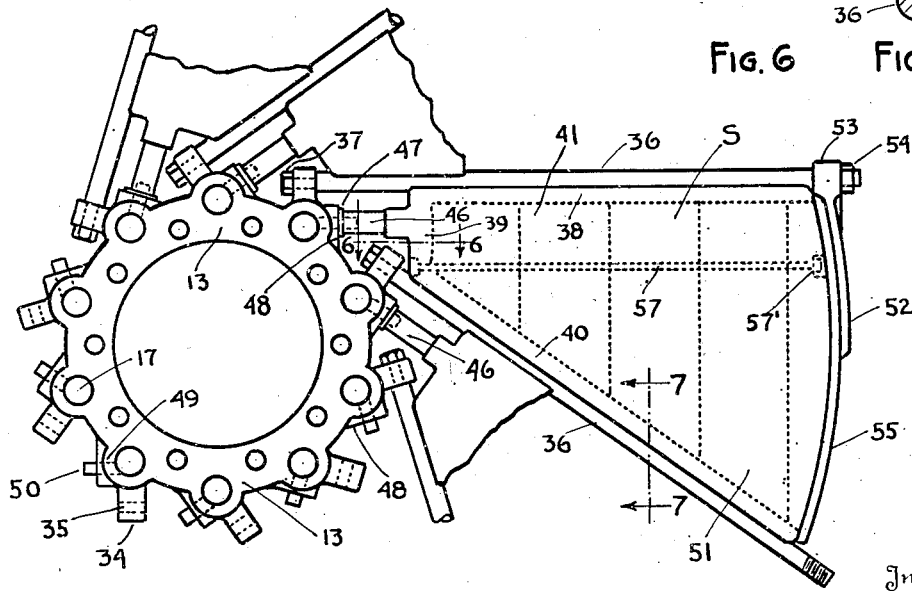
Figure 5 is an enlargement of a portion of the structure appearing in Figure 1, illustrating one form of segment structure and attachment.

Referring particularly to Figure 5, the ring section 13 is formed with lugs 34 adjacent each passage 17, these lugs being provided with bores 35 in which are received the reduced ends of spokes 36 secured by nuts 37. The spokes are equi-distantly spaced and lie in a common plane perpendicular to the axis of the ring section. The spokes are disposed as tangents of a circle concentric with the ring section, these tangents, designated T in Figure 3, intersecting to define a polygon P likewise concentric with the ring section.

Figures 6, 7:
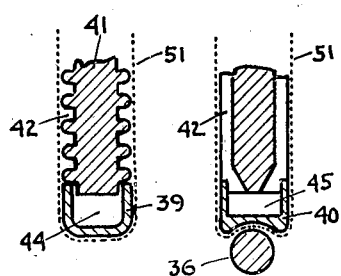
Figure 6 is a section on line 6—6 of Figure 5.
Figure 7 is a section on line 7—7 of Figure 5.

Supported between the rods are the filter segments S which comprise a frame made up of channels 38, 39, and 40 secured together so as to be insertible between adjacent spokes with channel 38 against the leading spoke, channel 40 against the trailing spoke, and channel 39 substantially perpendicular to the channel 38. The channels are faced inwardly and the outer faces of the converging longitudinal channels are slightly longitudinally grooved, as seen in Figure 7, for engagement with the spokes. The frame supports backing means for the filter medium comprising a number of flat pieces 41 provided with face corrugations 42, Figures 6 and 7, which may be perpendicular with respect to channel 38, as shown. The piece 41 which is adjacent channel 39 may be rabbeted for reception in the channel in the manner shown in Figure 6, leaving a flow space 44. The ends of the backing pieces are similarly rabbeted for engagement with frame members 38 and 40 leaving flow spaces as at 45, Figure 7, communicating with the space 44. As also shown in Figure 7, the edges of the backing pieces are reduced between the ribs 42 so that the channels between the latter can run into the flow passages as at 45.

An outlet neck 46, Figure 5, projects from channel 39 in parallel relation to the leading spoke 36 and is adapted to bear against a gasket 47 on a surface 48 of ring 13 which is perpendicular to the leading spoke 36. The gasket surrounds a bore 49 coaxial with neck 46 and leading into a conduit 17, a nipple 50 being set in the bore and telescopingly received in the end of neck 46.

The frame carrying the backing pieces 41 is covered by a filter medium of fabric 51. Each filter segment S is held in place between adjacent spokes, and with its neck outlet pressed against a gasket 47, by a clamping finger 52 including a boss portion 53 having a bore receiving the end of a spoke and secured thereon by a nut 54. As here shown, the finger 52 bears against a separate bag clamp 55 although the latter may be omitted when not needed. The clamping finger with or without the bag clamp can be relied on to hold the pieces 41 in the frame in use, but in order to provide a segment which can be readily handled for dressing, the pieces are preferably bored to receive a rod 57 which is secured at one end in perpendicular relation to channel 39 and whose other end has threaded thereon a nut 57' received in a counterbore in the outermost backing piece.

Where rods, as at 36 are used to detachably hold the improved segments in position on the rotatable center shaft, these rods are necessarily directed or bent backward from the rotational direction to the center shaft, i. e., purposely fastened to the center shaft collinear with the successive chords and therefore tangential to a circle concentric with the center of the shaft, and each filter segment drainage outlet 46 is likewise tangential to a circle concentric with the center of the center shaft and parallel with one of the two converging segment margins and therefore parallel with the center line of one of the tangential rods or spokes 36 and pointing into each filtrate conduit 17 in this direction. These filtrate conduits are, as in the standard construction, equally spaced in a circle around the center shaft and concentric with the center of said shaft. However, each branch port 49, Figure 5, connecting with its respective disk segment in my improvement is directed away from the center of the shaft at the proper angle to bring it in alignment with the segment drainage outlet 46.

Such a disk segment construction and disk assembly is purposely made in order to shift the geometric center of area of each disk segment materially nearer to the surface level L of the unfiltered mixture at the time of complete submergence of any disk segment than is the case with the standard sector and disk construction. The advantages gained by this novel change are material and of economic importance as will be presently demonstrated.

Figure 3:
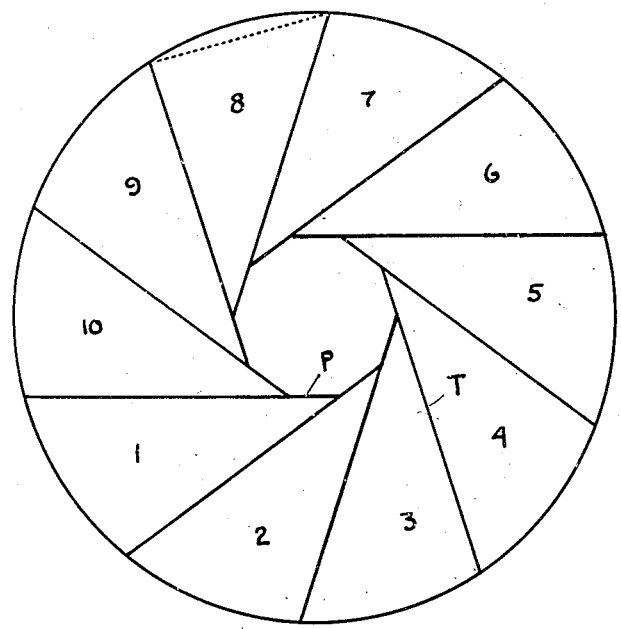
Figure 3 is a diagram illustrating the geometrical relationship of chords defining the lateral edges of disk segments in accordance with Figure 1.

As the converging lateral edges of each of the $n$ segments in my improved construction are primarily established by the level L of the unfiltered mixture cutting chords across the submerged portion of the disk in $n$ successive positions of the disk, these successive chords outlining the segments are not only tangential to a circle circumscribing the axis of rotation of the disk, but their inner apexes of successive chord triangles describe between their successive intersecting points a polygon P or $n$ sides concentric with the axis of disk rotation and leave a space for the center shaft. This is illustrated in Figure 3 wherein the geometric analysis of a ten segment disk shows the intersecting chords.

Although the geometric center of area of my triangular segments is somewhat nearer the longer of the two converging margins, it is in all cases definitely nearer the chord at the level L of the unfiltered mixture at the time each segment becomes fully submerged in this mixture than is the case with the standard sector construction. This is easily seen from examining Figures 1 and 2. This advantage is due to the fact that the apex of my improved triangular segments near the filtrate outlet 46 of each segment is tipped backward from the filtrate conduit 17, and the peripheral curvilinear base Sb of each triangular segment is thereby elevated nearer to the bath level L at the time of complete submergence of any single segment than is the case with each radial sector in the standard construction. In my improvement this lifts the entire segment edge Se and consequently the geometric center of segment filter area G nearer the bath level. The segment edge Se is therefore substantially parallel to the bath level L at the time of complete submergence. This is not the case with the standard construction where complete submergence of individual disk sectors depends more on submerging the final truncated sector corner $d'$.

In the standard disk filter this action of making the radial sector margin Se' (see Figure 2) fall substantially parallel with the level L of the unfiltered mixture bath at the time of submergence cannot be accomplished without having the level L high enough to be collinear with or slightly above the horizontal line $c$ passing directly through the center of the rotatable shaft and disk. This would result in two definite disadvantages, namely: (a) Too much disk area submergence during cake building and far too little area left for draining and/or spray washing and draining of the increased cake deposit. As hereinbefore emphasized such continuous filters require more time for draining and drying the cakes on the rotating sectors than for cake formation, and hence more sectors or segments out of submergence than in the same. Furthermore one and sometimes two sectors out of submergence are needed for cake removal and are therefore necessarily dead as far as cake building and draining are concerned. (b) Such a high disk submergence also necessitates further elevation of the cake removal scraper 33' above the horizontal center line of the rotatable shaft and disks in order to prevent unfiltered mixture from overflowing the tank at the lower ends of these scrapers where they incline toward the center shaft. Such an elevation again reduces the disk area out of submergence and hence both the area and time required for cake washing and/or draining and drying as well as cake discharge. In other words such a high submergence level is distinctly detrimental to the operation of such filters.

My improved disk construction results in enabling the geometric center of area of each completely submerged disk segment to travel through a longer arc of submergence during cake formation than is the case in the standard construction without resorting to such a high disk submergence. As previously emphasized and described herein the submergence level with my improved disk is purposely kept well below the horizontal center line of the disk and center shaft. In the example of my improved construction shown in Figure 1, the geometric center of segment area travels through a 120° arc in submergence before it emerges from the sludge bath. In other words the mean effective travel of this center of area in my improved disk segment is, with 10 disk segments and the same submergence level, over 23% greater than that of the standard type of disk construction having ten disk sectors, notwithstanding the fact that the cake draining travel and time may be identical in both instances.

Graphical analysis of this fact is hardly necessary if one examines the positions of the disk elements Nos. 10, and 1 to 4 inclusive in both Figures 1 and 2. In my improvement, segment No. 10 is entirely out of submergence and just finishing the cake discharge while segments 1, 2, 3 and a major fraction of No. 4 are in submergence, while with the standard construction in Figure 2, sector 9' is just finishing cake discharge while the major fraction of sector 10' is submerged but cannot be subjected to filtration, and sector 1', 2', a major fraction of 3', and a minor fraction of No. 4' are in submergence.

Although every filter begins with a permeable or porous support for the intercepted cake solids and this support in filtration literature is termed the filter base, filter medium, or septum, actually the filter medium for the entire cake building process is composed of this supporting filter medium and the cake of solid material collected thereon. After a short period of time the cake of accumulating solids becomes the actual filter medium. Pressure differential produces filtrate flow simultaneous with solid packing in the cake. The growing solid deposit and packing lengthen the filtrate void channels in the cake and diminish their size below that existing in the unfiltered mixture. This action rapidly throttles further filtrate flow. This throttling action is termed filter cake resistance and in most instances it rapidly exceeds the resistance of the supporting filter medium. In such continuous filters as herein described this initial cake thickness and its resistance is actually of most importance. Therefore my method of increasing the initial period of cake formation will not only produce a heavier cake of more uniform thickness than that of the standard type of disk filter but, as a consequence, will result in a greater filter yield of cake solids per unit of filter medium area when draining materials that normally have a fairly high cake resistance.

In addition to this material advantage of increasing cake forming cycle in such filters my improvement has other operating and structural advantages. As already demonstrated it takes more submergence depth to effect the cake building capacity of the standard disk filter than it does with my improvement. The point of automatic application of filtration differential in all of such filters is governed by a cut-off bridge in the normally stationary automatic valve controlling the opening of the successive filtrate conduits in the end of the central shaft. As this valve is well known to industrial practice it is indicated at 25 without details in Figure 8. With a higher bath submergence the cut-off bridge in this valve may be moved or rotated clockwise to the left and locked in position so that filtration starts earlier than at the level indicated in Figures 1 and 2. With a lower bath submergence than indicated in these figures the bridge is moved in the opposite direction.

Due to the fact complete submergence of any sector of the standard type of filter disk depends on submerging the corner $d'$ of each sector, a relatively large increase in submergence level L (Figure 2) is necessary to make any material shift of this corner $d'$ to the left so as to gain in cake forming cycle. As already emphasized, such a material increase in submergence means an undue shortening of cake draining time. The very opposite is the case with my improved disk construction for here a very slight shift of the pick-up bridge in the automatic valve towards the left materially raises the left hand corner Sc and the geometric center of area G of disk segment No. I going under complete submergence. Consequently my improved disk construction is less subject to variations in the operating level adopted for general filtration practice.

What is most important in this respect my improved disk construction permits operating such a filter at a lower submergence level and therefore at a longer cake washing and/or draining arc out of submergence than is possible with a standard disk having equivalent area and number of sectors. For example, on rather free filtering materials the automatic control valve bridge may be rotated counter clock-wise in my improvement and the geometric center of area of segment I then drops to a lower point in submergence before its filtrate conduit 17 is opened to the filtration impulse. Such a drop means a possible equivalent drop in the sludge level in tank 11 and a gain in the drying arc and consequently in draining or drying time. Obviously the bath level L can be dropped only far enough to secure complete submergence of the inner ends of the segments forming a cake and there is considerably more leeway in this respect with my construction than with that of the standard disk filter. With the same submergence level and same number of disk filters, placing my triangular segments so that the margin of each segment going under submergence is substantially parallel to the sludge level which in turn is tangential to a circle concentric with the center of the rotating filter shaft, permits increasing the distance $a$ below the center line $c$ Figure 1, to any desired economical limit while obtaining an optimum of segment area travel under submergence. Furthermore, in the standard construction, shortening the truncated filter disk sectors to permit the disk to operate at a lower submergence level and longer drying arc necessitates removing more total disk area for the overall disk diameter than is the case in my improved construction. As will be hereinafter demonstrated my center shaft construction is such that the segment supporting ring castings 13 may also be made interchangeable with others that may provide for decreasing or increasing the distance $a$ for complete segment submergence if desired.

In the standard disk construction the filtrate drain outlet for each sector is necessarily in the center of each sector. Also each sector is held firmly in position over its respective filtrate conduit 17' in the center shaft by two of the radial rods, their clamps and nuts on their outer ends. It therefore takes two radial rods and their clamps to tighten one sector in position on the center shaft. Referring to Figures 1 and 5, of my improvement, it will be seen that although each disk segment is situated between two tangential rods 36 and the rods serve the same purpose as in the standard disk filter, in reality but one rod and its nut 54 serves to tighten each segment in its position in my improvement. This is the rod 36 paralleling both the cake removal scraper edge 33 and the center line of the segment drainage pipe 46 of the segment belonging to the single tangential rod in question. The bag clamp 55 (Figure 5) for preventing cake formation on the extreme periphery of the filter disk and usually for sealing the ends of fabric bags mostly used to cover each segment, as well as the segment clamp 52 may be separate pieces as in the standard construction. However, in my improvement both the clamps 52 and 55 belonging to each individual segment are clamped and tightened into position by tightenng the single nut 54 belonging to the tangential rod paralleling the center line of the individual segment filtrate outlet 46 being so tightened. Each segment outlet 46 fits loosely over a nipple 50 fastened into the branch filtrate port 49 leading to the general filtrate conduit 17 in the center shaft and is tightened against a gasket 47 by means of the tangential rod nut 54 and clamps 52 and 55. If desired both the sector and bag clamps 52 and 55 in my improvement may be made integral.

Figure 4:
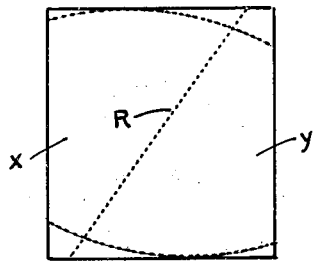
Figure 4 is a diagram showing a method of making two filtrate drainage or filter medium segments for my filter segments.

My improved disk segments may be constructed of the same materials used in the standard filters. Usually the filter medium is made of relatively porous durable fabric of various materials of organic, metallic or mineral fibres. In all instances such fabrics must be supported by the sector structure itself and this structure must be rigid and provide for filtrate drainage channels and leads for conducting the filtered liquid with minimum flow resistance to the filtrate outlets 46 and conduits 17. Whether the corrugated or otherwise channeled filter medium supporting structure be made of metal, plastic, or corrugated wood fitted into a proper sector binding frame both these permanent parts of the segments in my improvement and their replaceable medium dressings will be cheaper to construct than is the case with the standard disk sectors and their replaceable medium dressings. This will be seen from an examination of Figure 4 which is a diagram of the basic shape of two identical pieces of material used either for the permanent sector drainage backing under the filter medium, or for the filter medium itself. The two pieces $x$ and $y$, forming two truncated triangular leaf segments, are made from a normal stock rectangular piece of material with one diagonal cut R and with a minimum of material wasted. If corrugated wooden strips are to be used, a sufficient number of them of identical length are placed side by side to make the complete rectangle of Figure 4 with the corrugations running horizontally or vertically and then cut diagonally as indicated by the dotted line R to make the requisite backing for two disk segments. The same is true of cutting the filter medium fabric material from standard fabric widths. With this in mind the outer rim of each segment may be made either perfectly straight as shown by the dotted line in segment No. 8 of Figure 3, or curvilinear, i. e., a true circular arc as shown in the balance of the disk segments of this figure and in Figure 1.

In view of the fact the tangential rods in my improvement as shown in Figure 5 are necessarily parallel with each segment drainage channel or pipe 46, they can also be made collineal with the center line of said drainage pipe as shown in Figure 9. This construction somewhat increases the total filter area of each completely assembled disk and certainly makes it easy to not only use one tangential rod for tightening each segment into position on the center shaft, but what is of most importance, makes it possible to remove and replace any individual segment in the entire disk by simply unscrewing a single member which may be either separate from rod, as in Figure 5, or an integral part of said rod as in Figure 9. Any segment is then removed and replaced by a newly dressed segment without even loosening the nuts of any adjacent segments. After replacement the nut belonging to the replaced segment is again tightened. This arrangement is impossible with the standard disk filter where, as before stated, two neighboring radial rods and their nuts are necessary to tighten one intermediate sector in position on the center shaft.

In Figures 9 and 10 the spokes 58, which support the filter segments, themselves serve as drainage channels and to this end are constituted by pipe lengths. The ring section 59, which corresponds to the ring section 13 heretofore described, has openings 60 forming part of the filtrate conduits of the shaft. Outwardly of openings 60, ring 59 is provided with flat shoulder 61 in planes tangent to a common circle concentric with the ring. The ring is provided with bores 62 perpendicular to the ledges 61 and running into openings 60. Coaxially with bores 62 the ring is provided with smaller threaded bores 63 on the opposite sides of openings 60. Set in the outer ends of bores 62 are centering nipples 64 surrounded by gaskets 65. The nipples are telescopingly engaged in the inner ends of spokes 58, the inner edges of the latter being perpendicular to the spoke axes for engagement with gaskets 65. Fixed by threading, welding or brazing into the outer end of the spokes 58 are metallic bushings 66 through which are passed rods 67 coaxially with the spokes and with the nipples, each rod having a pointed threaded end engageable in a bore 63 and having a polygonal head 68 by which the rod can be tightened, the head bearing against a sparkplug gasket 68' on bushing 66 and forcing the inner end of the spoke against the gasket 65. The tubular spoke 58 and nipple 64 are of such size as to give ample flow space around rod 67 and, for the same purpose, the openings 60 may be cored square, as shown.

Fixed to each tubular spoke 58 in perpendicular relation thereto is a channel 69 which communicates with a slotted opening 70 in tube 58. Fixed to channel 69 is a channel 71 slightly longitudinally grooved as at 72, Figure 10, and adapted to lie along and against the spoke of the succeeding segment when its associated spoke is secured in place. The backing pieces 73 are secured in the frame constituted by the pipe and channels in the same manner as in the first embodiment and while only one of the backing pieces is shown as being corrugated, it will be understood that this applies to all. Adjacent channel 71 the backing pieces are formed exactly as in the first embodiment and this is shown in Figure 10. The other longitudinal edge of the backing means is slightly longitudinally grooved as shown at 74 so as to engage pipe 58, and the latter is provided with openings 75 communicating with the channels of the backing means. In this case the filter medium completely surrounds the frame and for each segment there may be provided a bag clamp 76 held in place by a screw 77. Slightly greater filter area is present than in the first embodiment.

This type of segment construction also permits making both the outer peripheral edge and its opposite inner edge in each segment curvilinear, i. e., like two concentric circles in the assembled disk. This means another slight gain in filter area for any given disk diameter and whereas the convergent edges of each segment in Figure 5 are of unequal length, in the construction shown in Figure 9 these convergent edges may be substantially of equal length, notwithstanding the fact that the point of convergence lies eccentric to the center of the rotatable shaft and filter disk.

In the case of Figure 9 the filter bag clamp 76 is not necessarily held in its position on the segment periphery by head 68 but may be so held by the separate screw 77 if such bag clamps are held necessary. With spare segments provided for quickly redressing such a disk filter such a construction is preferable as the clamps may be assembled on the spares before it is necessary to replace any segment, thus saving operating time when replacement is desirable. Otherwise such clamps may be eliminated if their use is unnecessary.

The fastening of the tangential rods to the center shaft in my improved disk filter requires a different center shaft structure than in the standard disk filter and this difference provides further structural improvements. In the standard disk construction the center shaft is usually made of cast iron or other cast metal. It is usually made of identical cast sections bolted longitudinally together and each center shaft section is drilled and tapped to take two complete disks and the drilling and tapping for a 10 sector disk requires twenty positions 18° apart around the circumference of each shaft casting for the ten radial rods and 10 filtrate ports into the conduits.

With my improved disk construction I have so fitted the design of the center shaft casting construction to the principle of having the tangential rods in parallel and/or collinear with each sector drainage nipple that the machine drilling and tapping are done in just one half the above number of positions required for the standard disk, namely only ten positions of 36° each apart around each shaft casting. In the construction used in Figure 5 the holes 35 in the center shaft lugs 34 may be drilled but not tapped. The tangential rods 36 are then turned down at their inner ends to fit snugly in each lug hole, threaded on the end and secured on the inner side of the lug by a locknut 37 which may be further secured in position by a cotter if necessary. The outer nut 54 is then used for detachably mounting each disk segment in position. In Figure 9 the rods are purposely made removable as already described and this construction is made possible because bushing 66, nipple 64 and the pointed inner end of rod 67 in the tapped hole 63 in the wall of filtrate conduit 60 insures easy centering of the rod and segment when tightening any entire segment in position in the disk.

In order to provide a simple method of manufacturing the center shaft casting for my improved disk filter and to provide more flexibility in attaching a various number of disks to a longitudinal center shaft as well as in providing interchangeable disk and segment supports for complete segment submergence at various bath levels I have evolved the simple ring castings shown in full face view in Figures 1, 5 and 9 and in sectional and full side views in Figure 8. Such a ring or its multiples are relatively inexpensive to cast and certainly less expensive to finish individually or in stacked series than is the case with the standard disk filter where such a construction is absent.

In such ring castings only the filtrate ports 17 or 60 need be cored and may be circular or square as indicated in Figures 5 and 9. The holes for the segment drainage nipples are both drilled and tapped in either construction. However, this drilling and tapping are done after any desired number of the ring castings are faced on both sides and on the inside to perfectly match with the flanges of the intermediate spacer castings 14 of Figure 8, which are used in the final assembly. After this facing operation of the rings, several of them are temporarily bolted or clamped together in stacked series and then the entire series is spot faced on the places intended for both the sector nipples, their gaskets, (and the shoulders of the tangential rods 36, Figure 5) drilled for both the tangential rods and nipples, and tapped where necessary in ten different 36° or $$\frac{360}{n}$$

degree positions (according to the number $n$ of segments) as already indicated. This not only results in easier drilling and tapping operations but in more accurate segment alignment than in standard disk filters in all cases where such disk filters are to be equipped with a multiple number of disks or where a plurality of stock size disk filters are to be manufactured.

This method of center shaft construction requires intermediate center shaft spacer castings 14, Figure 8, wherever more than one disk is mounted on a common shaft, i. e., none with a single disk filter, one with a two disk filter, two with a three disk filter, and so on. These spacer castings and segment supporting rings are equipped with gaskets and bolted together with longitudinal tie rods 18 (Figure 8), passing through holes in the ring sections to form the finished rotatable center shaft.

In Figure 8 the left hand portion of the assembled center shaft with segment supporting rings 13 and intermediate spacer casting 14 are shown in a horizontal section (plan view) through the horizontal center line of Figure 1. The longitudinal shaft tie rods 18 then become visible on the shaft interior. They are secured at the drive end to casting 15 of the filter and bolted to the opposite end bearing casting 16 to clamp all shaft sections firmly together. Usually the drive end casting 15 is an extension of the filter shaft containing filtrate conduits in a smaller circle concentric with the axis of rotation than in the disk holding portion of the shaft itself. The opposite end of the rotatable center shaft may be also equipped with an automatic valve if necessary. Two disks D are shown assembled in spaced position on ring castings 13 on the right hand end of the filter shaft 12 and the cake removal scrapers 32 and 33 are shown on the tank extensions 29 adapted to receive each disk individually and to permit dropping the discharged cakes by gravity through the space between said tank extension. The opposite side portion of tank 11 receives the disks collectively and, together with extensions 29 holds the bath of unfiltered mixture.

As the sector ring castings are absent in the standard disk filter such filters having one, three, five or any odd number of disks require either different center shaft casting pieces than is common with such filters having an even number of disks using at least one casting of unnecessary length in all cases where an odd number of disks may be required when the cast shaft sections are intended to receive an even number of disks. Due to this fact such standard filters are usually provided with shaft castings long enough to accommodate a minimum of two disks. My improved construction therefore provides for more flexibility in the manufacturing of multiple disk units and in the spaced relationship of the disks to one another along the rotatable shaft. This relationship is simply varied by varying the length of the intermediate spacer castings in various sizes and types of rotary disk vacuum or pressure filter units. The disk holding ring castings then become uniformly alike for all types of filters having the same number of disk segments in each disk. However, as before noted, these ring castings may be made interchangeable with others to provide for insuring complete initial segment submergence and a maximum travel of the geometric center of area of each segment in submergence at different bath levels L (Figure 1), below the axis of rotation of the rotatable shaft and assembled filter disk.

Tangential spokes are preferable in all instances where a relatively permanent filter medium or septum cannot be used. In draining most chemical precipitates and solids suspended in liquids containing solutes which tend to incrust the filter medium and render it highly resistant to filtrate flow the septum or filter medium has to be frequently changed or acid washed. It is then desirable to have spare segments with fresh medium dressings which may be readily substituted for segments covered with deteriorated dressings. All segments are therefore not only independently replaceable but of similar construction and nature to be interchangeable. The tangential spokes are a material asset in such filter dressing operations.

However, where the dressings may be of metallic or other durable mesh weave and used in filtration where incrustation is largely absent, the segments may be used for a year or more without the necessity of frequent replacement. In such cases the actual use of tangential rods may be dispensed with and the individual segments simply bolted to the center shaft ring castings by means of flanges on the end of the filtrate drainage pipes and short stud bolts or cap screws used for this purpose. Such a means of detachably connecting individual segments to their respective shaft filtrate conduits in the ring castings and/or ported center shaft does not alter the essential shape and purpose of my improved segments nor their position relative to the center shaft and the bath of unfiltered mixture.

Having thus described my invention for improvements in continuous rotary disk filter construction, what I claim is:

1. Filtering apparatus comprising a shaft having a plurality of longitudinally extending filtrate conduits therein disposed around the shaft axis, a plurality of equally spaced spokes mounted on said shaft in a plane perpendicular to said axis, said spokes being disposed as tangents of a circle concentric with the shaft, triangular filter disk segments with side filtering surfaces mounted between and supported by said spokes and substantially conforming to the spaces defined thereby, each of said segments having a drainage opening adjacent said shaft, said shaft having openings to the filtrate conduits respectively aligned with the disk element openings, each pair of aligned openings being on a line parallel to a line parallel to one of the adjacent spokes, and a telescoping connection between each pair of aligned openings on the line thereof.

2. Filtering apparatus comprising a rotatable shaft including a plurality of ring sections with a separate spacer section therebetween and relatively wider than said ring sections, means releasably securing said sections together, said shaft having a plurality of longitudinally extending filtrate conduits therein disposed around the shaft axis and extending through said sections, segmental filter disk units with side filtering surfaces supported by said ring sections, and drainage connections between said units and the filtrate conduits including openings in the associated ring sections.

3. Filtering apparatus comprising a tank, a rotatable shaft mounted with a portion thereof extending across the tank, means for rotating the shaft in a certain direction, said shaft having a plurality of longitudinally extending filtrate conduits disposed around its axis, a filter disk with side filtering surfaces mounted on said shaft portion perpendicularly to the shaft axis for rotation with the shaft and comprising a plurality of separate, individual, generally triangular filter elements which do not communicate one with the others along their adjacent edges, each having lateral edges converging inwardly from the disk perimeter and forwardly with respect to the direction of shaft rotation toward a point of intersection on a polygon concentric with the shaft and spaced from the axis of said shaft, a prolongation of the said edges of the individual elements describing the sides of a polygon concentric with the shaft axis and spaced therefrom, means for maintaining in said tank a liquid-solid bath at a level such that less than half of the disk is submerged, the disposition of the trailing lateral edges of said elements being such that upon rotation of the disk the trailing edge of each element on the submerging side of the disk becomes horizontal at a level below the shaft axis, and a drainage connection between each disk element and one of said conduits.

4. Filtering apparatus comprising a tank, a rotatable shaft mounted with a portion thereof extending horizontally across the tank, means for rotating said shaft in a certain direction, said shaft having a plurality of longitudinally extending filtrate conduits disposed around its axis, a plurality of spokes mounted on said shaft in a plane perpendicular to said axis and disposed as tangents of a circle concentric with said shaft and spaced from the axis of said shaft, generally triangular filter disk elements with side filtering surfaces mounted between and supported by said spokes and substantially conforming with the spaces between the spokes and which do not communicate one with the other along the edges engaged by said spokes, means for maintaining in said tank a liquid-solid bath at a level such that less than half a disk is submerged, the disposition of the trailing lateral edges of said disk elements being such that upon rotation of the disk the trailing edge of each element on the submerging side of the disk becomes horizontal at a level below the shaft axis, and a drainage connection between each element and one of said conduits.

5. Filtering apparatus comprising a shaft having a plurality of longitudinally extending filtrate conduits, openings in said shaft to the respective conduits, said openings being arranged on the shaft in a common radial plane, tubular spokes arranged around said shaft in communication with said openings respectively; means securing said spokes to said shaft comprising rods extending longitudinally within the spokes and threaded into the shaft through said openings, and means at the outer ends of said rods engaged against and closing the outer ends of said spokes; and triangular filter disk elements with saide filtering surfaces supported by said spokes, each of said disk elements being in flow communication with a spoke.

6. Filtering apparatus comprising a shaft having a plurality of longitudinally extending filtrate conduits, openings in said shaft to the respective conduits, said openings being arranged around the shaft in a common radial plane, tubular spokes arranged around said shaft in communication with said openings respectively and disposed as tangents of a circle concentric with said shaft, means securing said spokes to said shaft, triangular filter disk elements which do not communicate one with the other along their adjacent edges, said elements being provided with side filtering surfaces mounted between said spokes and substantially conforming to the spaces defined thereby, each of said elements being in flow communication with an adjacent spoke, and means closing the outer ends of said spokes.

7. Apparatus according to claim 6 wherein the means securing said spokes to said shaft comprises rods extending longitudinally within the spokes and threaded into the shaft through said openings, and means at the outer ends of said rods engaging against and closing the outer ends of said spokes.

8. Filtering apparatus comprising a shaft having a plurality of longitudinally extending filtrate conduits therein, a plurality of spokes mounted on said shaft and disposed as tangents of a circle concentric with said shaft, triangular filter disk elements having side filtering surfaces mounted between said spokes and substantially conforming to the spaces defined thereby, means releasably securing each disk element to one only of the adjacent spokes, each disk element having a transversely concave lateral edge normally engaging the other adjacent spoke but freely releasable therefrom upon movement of the element away from said shaft, each of said elements having a drainage opening adjacent said shaft, said shaft having openings to the filtrate conduits respectively aligned with the disk element openings, each pair of aligned openings being on a line parallel to a line parallel to the spoke to which the disk element which has the drainage opening is secured, and a telescoping connection between each pair of aligned openings on the line thereof.

9. Apparatus according to claim 8 wherein said releasable securing means comprises a clamping member removably attached to the outer end of said one of the adjacent spokes and engaged over the outer edge of a single disk element only.

10. Filtering apparatus comprising a shaft having a plurality of longitudinally extending filtrate conduits, openings in said shaft to the respective conduits, said openings being arranged around the shaft in a common radial plane; a plurality of triangular filter disk sections each including a frame comprising a pair of side members in angular relation and a cross member connecting said side members at their converging ends, backing means supported by the frame, and a filtering medium enveloping said frame and backing means, one of the side members of each frame being tubular and the other having a transversely concaved outer edge; said elements being disposed around said shaft in disk formation with the tubular members in communication with said openings respectively and with the outer longitudinal edges of the tubular members engaged in the concavities of the other side members of adjacent frames so that the disk has substantially continuous side filtering surfaces, and means removably securing the disk sections to the shaft.

11. Structure according to claim 10 wherein said tubular members are disposed as tangents of a circle concentric with said shaft.

12. An assembly including a frame comprising a pair of elongated side members disposed in angular relation and a cross channel member forming a drainage connection between said side members at their converging ends, triangular backing means for a filtering medium secured in said frame, said channel member being faced toward said backing means and said backing means having passages for drainage to said channel member, said side members having rectilinear outer edges, and a drainage tube projecting outwardly of said channel portion in parallel relation to a line parallel to one of said edges, and means for securing said side members, channel member, backing means, and drainage tube together.

13. An assembly including a frame comprising a pair of elongated side members disposed in angular relation and a cross channel member forming a drainage connection between said side members at their converging ends, triangular backing means secured in said frame, said channel member being faced toward said backing means and said backing means having passages for drainage to said channel member, and a drainage tube projecting outwardly of said channel member in parallel relation to one of said side members, and means for securing said side members, channel member, backing means and drainage tube together.

14. An assembly including a frame comprising a pair of elongated side channel members in angular relation and with their channels faced toward each other and a cross channel member forming a drainage connection between said side members at their converging ends, triangular backing means secured in said frame, said cross member having its channel faced toward said backing means and said backing means having passages for drainage to said cross member, and a drainage tube projecting outwardly of said cross member in parallel relation to one of said side members, and means for securing said side members, channel member, backing means and drainage tube together.

15. An assembly including a frame comprising elongated side members arranged in angular relation, one of said members being tubular, a cross member forming a drainage connection between said members at their converging ends, and triangular backing means for a filtering medium secured in the space defined by said members and substantially conforming thereto, said tubular member having a side opening and said backing means having passages for drainage to said opening, and means for securing said side members, said cross member and said backing means together.

16. An assembly comprising an elongated tubular member, an elongated channel member in angular relation to said tubular member with its channel faced toward said tubular member, a cross channel member forming a drainage connection between said members at their converging ends with its channel faced in the direction of their divergence, and triangular backing means for a filtering medium secured in the space defined by said members and substantially conforming thereto, said tubular member having a side opening to the channel of said cross member, and said backing means having passages for drainage to said opening, and means for connecting said tubular member, said elongated channel member, said cross channel member, and said triangular backing means together.

17. Filtering apparatus comprising a built-up shaft including end journal sections, ring sections between said journal sections, a separate spacer section between said ring sections and relatively wider than said ring sections, means releasably clamping said sections together, longitudinally extending filtrate conduits in said shaft arranged around the shaft axis and extending through said ring and spaced sections and one of said journal sections, openings in said ring sections to the respective conduits, spokes mounted on said ring sections in planes perpendicular to said axis, triangular filter disk elements with side filtering surfaces mounted between and supported by said spokes and substantially conforming to the spaces defined thereby, and a separable drainage connection between each of said elements and one of said openings.

18. Filtering apparatus comprising a shaft having a plurality of longitudinally extending filtrate conduits therein disposed around the shaft axis, a plurality of substantially identical triangular area elements with side filtering surfaces arranged around the shaft and removably secured thereto to constitute a disk, the lateral edges of each disk element being on lines which converge inwardly from the disk perimeter to a point of intersection on a common circle concentric with the shaft, the points of intersection of the lateral edge lines of the several disk elements being substantially equally spaced on said circle, each of said elements having a drainage opening adjacent said shaft, said shaft having openings to the filtrate conduits respectively aligned with the disk element openings, each pair of aligned openings being on a line parallel to a line parallel to a lateral edge of the disk element which has the drainage opening, and a telescoping connection between each pair of aligned openings on the line thereof.

ALBERT L. GENTER.

(References on following page)

REFERENCES CITED

The following references are of record in the file of this patent:

UNITED STATES PATENTS

| Number | Name | Date |
|---|---|---|
| 893,104 | Schorr | July 14, 1908 |
| 1,266,133 | McCaskell | May 14, 1918 |
| 1,293,555 | Salisbury | Feb. 4, 1919 |
| 1,538,980 | Genter | May 26, 1925 |
| 1,860,937 | McCaskell | May 31, 1932 |
| 1,887,129 | Hirsch | Nov. 8, 1932 |
| 2,167,322 | Cuno et al. | July 25, 1939 |
| 2,351,652 | Anderson | June 20, 1944 |
| 2,406,065 | Dickinson et al. | Aug. 20, 1946 |

FOREIGN PATENTS

| Number | Country | Date |
|---|---|---|
| 28,649 | Netherlands | Nov. 16, 1932 |
| 177,819 | Great Britain | Apr. 4, 1922 |
| 594,953 | Germany | Mar. 23, 1934 |
| 605,380 | Germany | Nov. 9, 1934 |